United States Patent
Himberger et al.

(10) Patent No.: US 8,108,932 B2
(45) Date of Patent: Jan. 31, 2012

(54) CALCULATING A PASSWORD STRENGTH SCORE BASED UPON CHARACTER PROXIMITY AND RELATIVE POSITION UPON AN INPUT DEVICE

(75) Inventors: Kevin D. Himberger, Durham, NC (US); Benjamin M. Parees, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 12/137,645

(22) Filed: Jun. 12, 2008

(65) Prior Publication Data

US 2009/0313696 A1    Dec. 17, 2009

(51) Int. Cl.
*G06F 11/00* (2006.01)
*G06F 12/14* (2006.01)
*G06F 12/16* (2006.01)
*G08F 23/00* (2006.01)

(52) U.S. Cl. .......................................... 726/25; 713/183
(58) Field of Classification Search ................. 726/25; 713/183, 184
See application file for complete search history.

(56) References Cited

U.S. PATENT DOCUMENTS

| | | | |
|---|---|---|---|
| 5,430,827 A * | 7/1995 | Rissanen | 704/272 |
| 6,839,667 B2 * | 1/2005 | Reich | 704/240 |
| 7,367,053 B2 * | 4/2008 | Sanai et al. | 726/6 |
| 2008/0066167 A1 * | 3/2008 | Andri | 726/5 |
| 2009/0150677 A1 * | 6/2009 | Vedula et al. | 713/183 |
| 2010/0031343 A1 * | 2/2010 | Childress et al. | 726/18 |
| 2010/0114560 A1 * | 5/2010 | Spataro | 704/9 |

* cited by examiner

*Primary Examiner* — Kambiz Zand
*Assistant Examiner* — Dant Shaifer Harriman
(74) *Attorney, Agent, or Firm* — Patents on Demand P.A.; Brian K. Buchheit; Scott M. Garrett

(57) ABSTRACT

A solution for computing password strength based upon layout positions of input mechanisms of an input device that entered a password. A password including an ordered sequence of at least two characters can be identified. A position of each of the characters of the sequence can be determined relative to a layout of an input device used for password entry. Each position can correspond to an input region (key) of the input device (keyboard). A proximity algorithm can generate a proximately score for the determined positions based upon a pattern produced by the positions given the layout of the input device. A password strength score can be computed based at least in part upon the proximity score.

20 Claims, 4 Drawing Sheets

Heuristic 202

| 0 | 1 | 2 | 3 | 4 | 5 | 6 | 7 | 8 | 9 | 10 | 11 | 12 |
|---|---|---|---|---|---|---|---|---|---|----|----|----|
| 1 | 1 | 2 | 3 | 4 | 5 | 6 | 7 | 8 | 9 | 0  | -  | =  |
| 2 | Q | W | E | R | T | Y | U | I | O | P  | [  | ]  |
| 3 | A | S | D | F | G | H | I | K | L | ;  | '  |    |
| 4 | Z | X | C | V | B | N | M | , | . | /  |    |    |

Password: uiol.,m x average = $(3*7+2*8+3*9)/8 = 8$
y average = $(3*2+2*3+3*4)/8 = 3$
center = $(8,3)$
average distance from center:
$(1.41+1+1.41+1+1.41+1+1.41+1)/8 = 1.2$

Heuristic 210

| 0 | 1 | 2 | 3 | 4 | 5 | 6 | 7 | 8 | 9 | 10 | 11 | 12 |
|---|---|---|---|---|---|---|---|---|---|----|----|----|
| 1 | 1 | 2 | 3 | 4 | 5 | 6 | 7 | 8 | 9 | 0  | -  | =  |
| 2 | Q | W | E | R | T | Y | U | I | O | P  | [  | ]  |
| 3 | A | S | D | F | G | H | J | K | L | ;  | '  |    |
| 4 | Z | X | C | V | B | N | M | , | . | /  |    |    |

Password: qwertyhn vectors required to cross all password characters in order: 2

FIG. 2

Heuristic 302

| 0 | 1 | 2 | 3 | 4 | 5 | 6 | 7 | 8 | 9 | 10 | 11 | 12 |
|---|---|---|---|---|---|---|---|---|---|---|---|---|
| 1 | 1 | 2 | 3 | 4 | 5 | 6 | 7 | 8 | 9 | 0 | - | = |
| 2 | Q | W | E | R | T | Y | U | I | O | P | [ | ] |
| 3 | A | S | D | F | G | H | J | K | L | ; | ' | |
| 4 | Z | X | C | V | B | N | M | , | . | / | | |

Password: qwaszx 306
    Individual distances: Q->W=1, W->A=1.41, A->S=1, S->Z=1.41, Z->X=1
    Total distance=5.42
    Average distance=5.42/5=1.084 (5, not 6, there are 5 distances)

FIG. 3

CALCULATING A PASSWORD STRENGTH SCORE BASED UPON CHARACTER PROXIMITY AND RELATIVE POSITION UPON AN INPUT DEVICE

BACKGROUND OF THE INVENTION

The present invention relates to the field of password security, more particularly to calculating a password strength score using heuristics measuring character proximity and relative position.

Passwords are commonly used to secure content from unwanted access. Typically passwords are associated with a username or login. Because passwords are used so commonly, secure passwords are required to maintain an acceptable level of security. Users are often allowed to create their own passwords when using certain services. Because of this, the passwords they create are prone to human error. Some users choose easy to remember passwords to avoid forgetting. Easy to remember passwords can be very insecure because they can sometimes be names or phrases other people that are related to the user can guess easily. Because users can come up with insecure passwords, guidelines are often created to aid users in creating a secure password. For example, a password can have a minimum length and require the use of certain characters (i.e. mixed-cases characters, numbers, punctuation characters).

Although these guidelines can help, they can still allow the creation of insecure passwords. For example, a password must be a minimum of eight characters and must contain at least one number. The user creating the password decides on the password "123qweasd" which fits the stated guidelines. Although the password fits the guidelines, the chosen password fits a common pattern on a standard keyboard layout. The characters that make up the password forms 3 groups of adjacent characters: "123," "qwe," and "asd." Because the motion to type this password is very simple, when the user types the password, someone nearby can notice the pattern and understand the user's password. In addition to "shoulder surfing," brute force attacks become more feasible as software can be written to favor tests of passwords that contain characters close to one another. A more secure set of guidelines is required to aid users in creating secure passwords for improved security.

BRIEF DESCRIPTION OF THE SEVERAL VIEWS OF THE DRAWINGS

FIG. 2 illustrates heuristic measurements for calculating a password strength score using heuristics measuring character proximity and relative position in accordance with an embodiment of the inventive arrangements disclosed herein.

FIG. 3 illustrates a heuristic measurement for calculating a password strength score using heuristics measuring character proximity and relative position in accordance with an embodiment of the inventive arrangements disclosed herein.

DETAILED DESCRIPTION OF THE INVENTION

Figure 1:
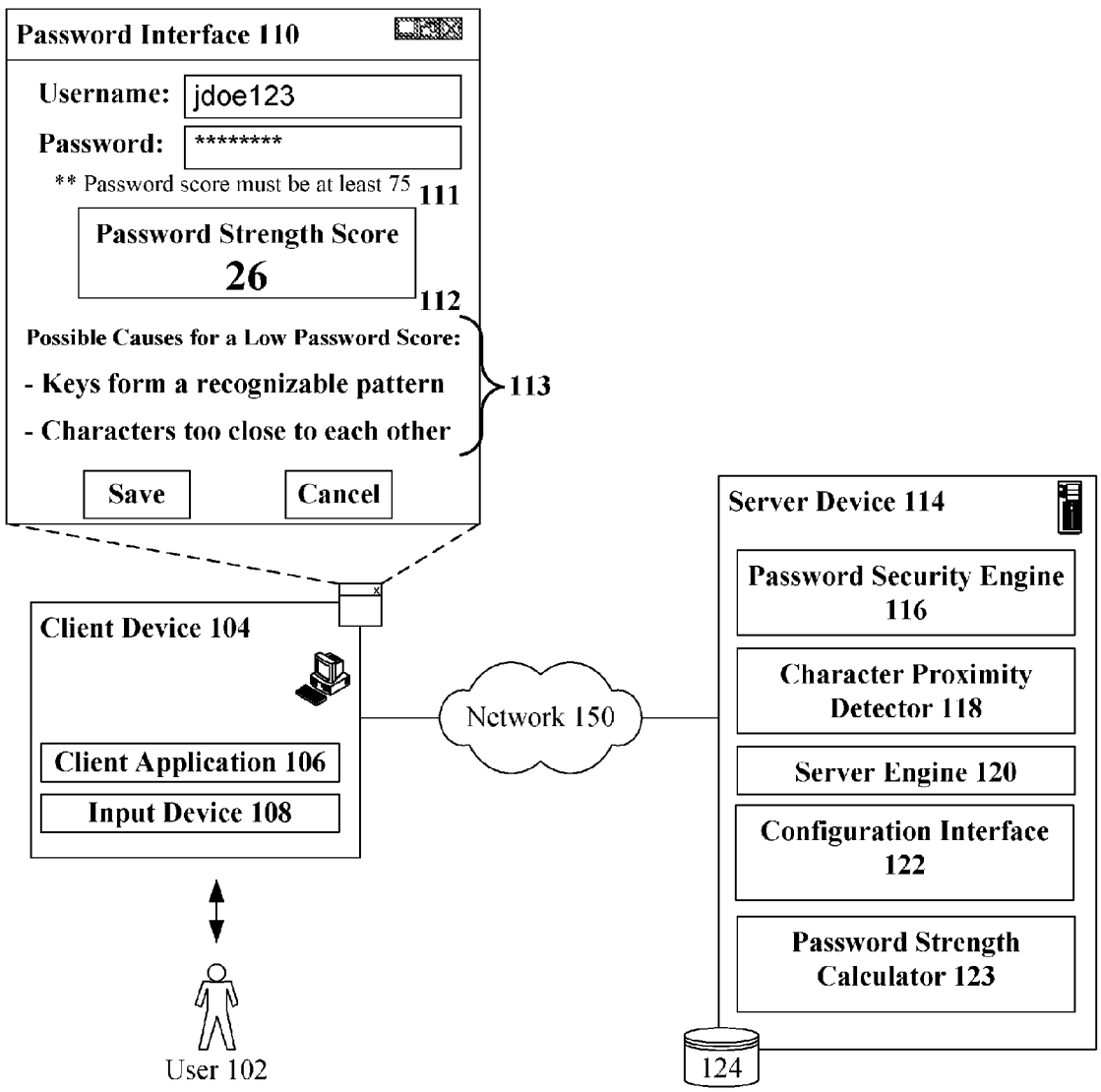
FIG. 1 is a schematic diagram of a system for calculating a password strength score using heuristics measuring character proximity and relative position in accordance with an embodiment of the inventive arrangements disclosed herein.

The present invention can allow for stricter and more secure password guidelines by calculating password strength score using heuristics measuring character proximity and relative position. As a user is entering a desired password to be associated with secured content, the password can be checked for varying password strength. Algorithms can be processed to generate a representational number of how secure the password being entered is. Heuristics can be utilized to recognize patterns in the entered password by measuring the proximity and relative position of the characters used in the password. Each available character in the input layout can be associated with a grid for measurements. For example, point can be determined that is the center of the characters used in the password. The distances to each key from the center point can be measured from the locations of the key on the grid. For example, this measurement can be used to recognize such pattern as when a password begins with a character and travels clockwise. In another example, the number of groups of adjacent characters can be measured to detect such a pattern when a user creates a password with a plurality of characters in the same row.

Measuring these characteristics of the password can allow for stricter password guidelines. The present invention can determine a password strength score using this information. The strength score can be compared to a preconfigured score or range of scores that are acceptable as a password and the security engine can act accordingly.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for calculating a password strength score using heuristics measuring character proximity and relative position in accordance with an embodiment of the inventive arrangements disclosed herein. In system 100, user 102 can interact with client device 104 to interact with server device 114 via network 150. In one embodiment (not shown) the password enhancements described in system 100 can be implemented in a stand-alone (as opposed to a networked) fashion using software local to device 104.

Server device 114 can host a service or services for user 102 to interact with. Such services can include email, text exchange, electronic banking, and the like. User 102 can interact with password interface 110, which can illustrate a sample interface provided by client application 106. Interface 110 can be used to request account credentials to be used on server device 114. Server device 114 can implement password security engine 116, character proximity detector 118, and password strength calculator 123 to calculate a password strength score using heuristics measuring character proximity and relative position. When user 102 provides a password to server device 114 using password interface 110, server device 114 can generate a password strength score associated with the supplied password. The generated password strength score 111 can be conveyed to client device 104 and displayed to user 102 as illustrated by password strength label 112. The password strength score 111 need not be displayed to a user 102, but can instead be used to drive programmatic processes relating to security.

Once a password is supplied to server device 114, password security engine 116 can determine if the password meets minimum security requirements in accordance with a security configuration stored on data store 124. If the password fails to meet minimum security requirements, server device 114 can notify the user and prompt the user to specify a new password. If the password meets minimum security requirements, the account information provided by user 102 can be saved to data store 124 to be used by server engine 120. After the account has been associated with the provided password, user 102 can use the password to access the service or services hosted by server device 114. In an alternative embodiment, this password security check could be pushed down to the client 104. The preferred embodiment is with the server 114 configuration.

Client device 104 can be any computing device in which can communicate with server device 114 and convey a password to be associated with an account or the like on server device 114. Client device 104 can present password interface 110 to user 102 for specification of a password to be conveyed to server device 114 to protect user 102's content and/or account. Client device 104 can be any computing device, including, but not limited to, a desktop computer, a laptop computer, a gaming console, a mobile phone, or the like.

Client application 106 can be any application capable of communicating with server engine 120 of server device 114. Client application 106 can implement a protocol in which can communicate via network 150 with server device 114. Client application 106 can be any type of communication application, including, but not limited to, a web browser, collaboration software client (i.e. email client, conferencing software), and the like.

Input device 108 can be any piece of equipment used to provide data and control signals to an information processing system. Common input devices include, but are not limited to a keyboard, mouse, touch sensitive display, and composite devices such as a game controller. Composite devices can combine multiple input devices into a single physical device. Such input devices can be used by user 102 to provide a password to client application 106 for conveyance to server device 114. For example, a user can type the password on a keyboard, or can use a composite or pointing device in conjunction with a virtual keyboard to supply the password.

Password interface 110 illustrates a sample interface that client application 106 can present to user 102 to accept information for conveyance to server device 114. Password interface 110 can include label 111, which can display a required password score, or range, for the password to be acceptable by server device 114. It is contemplated that the required password score or range can be user configurable and can vary per embodiment. Control 112 can display a password strength score pertaining to the typed password. The password strength score can raise or lower in real-time as the password is modified by the user. Labels 113 can display suggestions to user 102 to improve a low password strength score. Labels 113 can also be updated in real-time as the password is modified by the user.

Server device 114 can be a computing device used to host data or an account held by user 102. In other embodiments, server device 114 can be implemented as an intermediary server for another server in which is running a service or services. In these embodiments, server device 114 can act as a security device and manage account credentials for users. Server device 114 can store data regarding user 102's account on data store 124. Server device 114 can host a plurality of different services (or can be dedicated for one specific service) for use by a remote user such as user 102. Such services can include, but are not limited to, email, social networking (i.e. MYSPACE, FACEBOOK), collaborative software, bank account access, forums, and the like.

Server engine 120 can provide the necessary server functionality to host a service or services on server device 114. Server engine 120 can interact with remote users to allow access to resources on server device 114. Server engine 120 can be implemented in many ways in accordance with the functionality described herein. For example, server engine 120 can include a web server (i.e. APACHE, IIS) for serving content via network 150. In this example, server engine 120 can also include a language interpreter (i.e. PHP, ASP, PERL) and/or a database server (i.e. MYSQL, POSTGRESQL, ORACLE) to provide the necessary functionality to host a service or services via network 150.

Configuration interface 122 can allow the configuration of password security engine 116. Configuration interface 122 can allow for local or remote configuration. Configuration interface 122 can allow for such settings as the required password strength score range, thresholds for using heuristics to determine a password strength score, and the like. The present invention can allow for any arbitrary level of configuration in accordance with the functionality described herein. Configuration interface 122 can store the set of specified configuration options on data store 124 for use by other components of server device 114. Configuration interface 122 can be, but is not limited to, a web interface, a modifiable configuration file, an interface presentable in a compatible configuration client (not shown), and the like.

Password security engine 116 can be machine-readable code that can enforce security guidelines for password strength against a password supplied by a user to protect content stored on data store 124 of server device 114. Password security engine 116 can enforce configuration options stored and specified by configuration interface 122. To enforce such configuration options, password security engine 116 can interface with character proximity detector 118 and password strength calculator 123.

Character proximity detector 118 can be machine-readable code used to calculate heuristics for a password provided by user 102 using password interface 110. Character proximity detector 118 can examine the individual characters provided in the password and determine relevant information. For example, character proximity detector 118 can determine the average distance between each character, a common center point all the characters share, and groups of adjacent characters. These characteristics can be conveyed to and used by password strength calculator 123 to determine the strength of the supplied password.

Password strength calculator 123 can use a plurality of algorithms and supplied password characteristics to determine the strength of the supplied password. It is contemplated that certain characteristics can be configured to hold more weight in determining a password score than others. For example, password strength calculator 123 can use the data provided by character proximity detector 118 and other predefined characteristics (i.e. password length, character types) to determine a password strength score. In this example, it can be configured that the length of the password can be the most important factor when calculating a password strength score (i.e. if the password is shorter than a certain length, the score defaults to 0).

Data store 124 can be physically implemented within any type of hardware including, but not limited to, a magnetic disk, an optical disk, a semiconductor memory, a digitally encoded plastic memory, a holographic memory, or any other recording medium. The data store 124 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Network 150 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 150 can include local components and data pathways necessary for communications to be exchanged among computing device components and between integrated device components and peripheral devices. The network 150 can also include network equipment, such as routers, data lines, hubs, and intermediary servers which together form a packet-based network, such as the Internet or an intranet. The network 150 can further include circuit-based communication components and mobile communication components, such as telephony switches, modems, cellular communication towers, and the like. The network 150 can include line based and/or wireless communication pathways.

FIG. 2 illustrates heuristic measurements for calculating a password strength score using heuristics measuring character proximity and relative position in accordance with an embodiment of the inventive arrangements disclosed herein. FIG. 2 includes heuristics 202 and 210. Heuristic 202 can illustrate password 206 as it appears on a grid 204. Grid 204 illustrates the necessary characters highlighted that are required to make up password 206. Description 208 illustrates how the heuristic is measured. Description 208 first calculates the average horizontal coordinate of each key. Next, description 208 calculates the average vertical distance of each key. These give us the center point of the keys used. Next, the distance from each key to the center is calculated, and the average of these values is found. The average distance from the center point can allow for the recognition of certain patterns, such as the one illustrated in grid 204. The average distance can be compared against a predetermined value or range of values and be used to determine a password strength score.

Heuristic 210 can illustrate password 214 as it appears on grid 212. Description 216 can illustrate how heuristic 210 can be measured. Grid 212 illustrates that password 214 creates two vectors, or line segments. These vectors are made up of groups of adjacent characters, in the order they're used in the password. Description 216 shows the total number of vectors in the password. This value can allow for the recognition of certain patterns, such as the one illustrated in grid 212. This value can also be compared against a predetermined value or range of values and be used to determine a password strength score.

FIG. 3 illustrates a heuristic measurement for calculating a password strength score using heuristics measuring character proximity and relative position in accordance with an embodiment of the inventive arrangements disclosed herein. FIG. 3 includes heuristic 302, which can illustrate password 306 on grid 304. Description 308 can illustrate how heuristic 302 can be measured. In description 308, first the individual distances between each pair of characters (in the order they've been entered) are measured. Next, the distances are totaled, and then the average distance between keys is calculated. This value can allow for the recognition of certain patterns, such as the one illustrated in grid 304. This value can also be compared against a predetermined value or range of values and be used to determine a password strength score.

Figure 4:
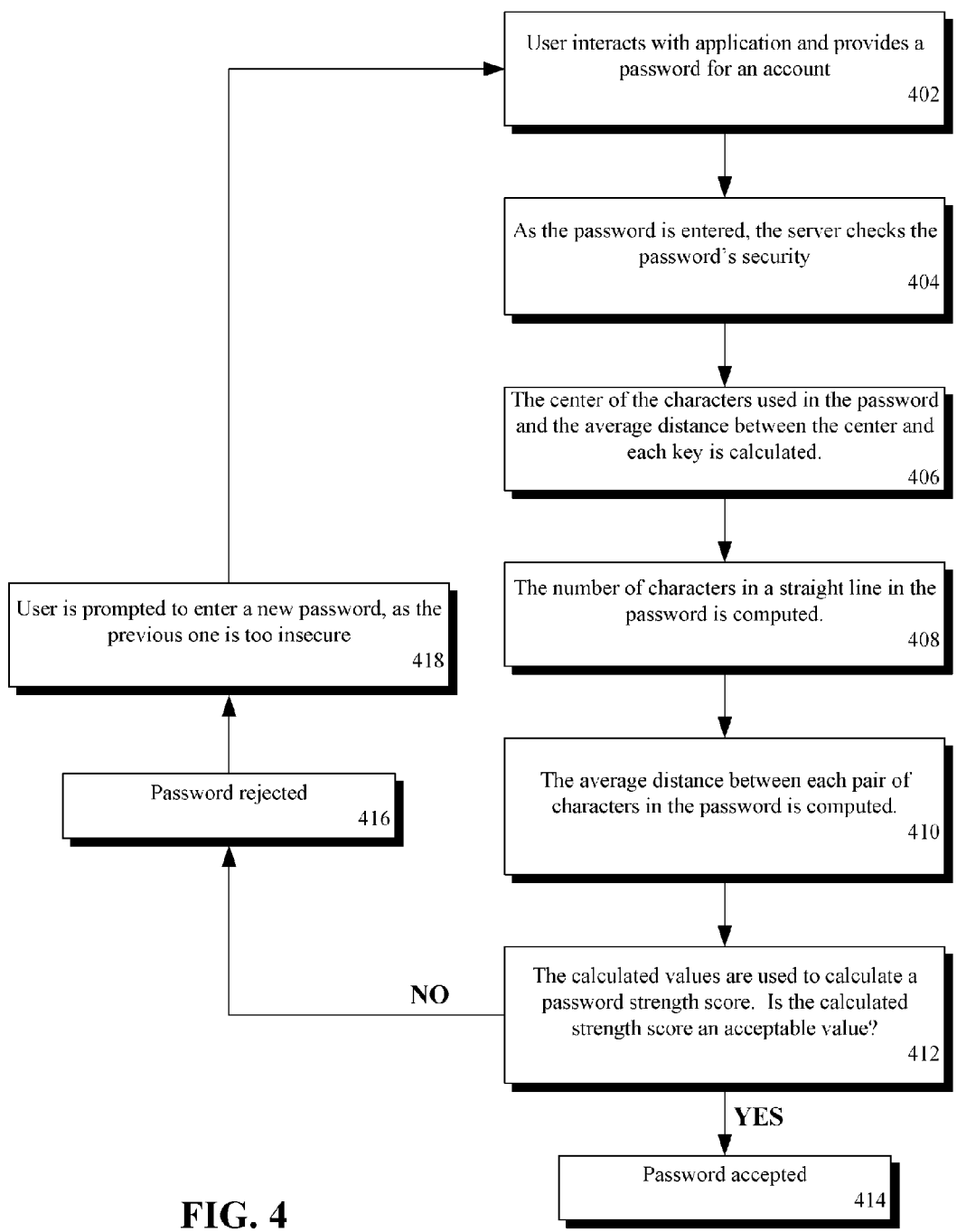
FIG. 4 is a flow chart of a method for calculating a password strength score using heuristics measuring character proximity and relative position in accordance with an embodiment of the inventive arrangements disclosed herein.

FIG. 4 is a flow chart of a method 400 for calculating a password strength score using heuristics measuring character proximity and relative position in accordance with an embodiment of the inventive arrangements disclosed herein. Method 400 can be performed in the context of a system 100. Method 400 can begin in step 402, where a user can interact with an application and provide a password for an account. In step 404, the application server can check the password's security as it is typed. In step 406, the center point of the characters used in the password and the average distance between the center point and the characters can be calculated. In step 408, the number of sequential characters in a straight line (i.e. all are adjacent) in the password can be calculated. In step 410, the average distance between each pair of characters in the password can be computed in order. In step 412, the calculated values can be used to calculate a password strength score. The average distances between each key and the center can be compared to a threshold (a range of acceptable values), the number of groups of adjacent characters can be compared to a preconfigured limit, and the average distance between each pair of characters can be compared to a threshold. These comparisons, along with others, can allow the computation of a password strength score. This score can be compared to a preconfigured threshold of acceptable password scores. If in step 412, the password has reached an acceptable score, method 400 can continue to and complete in step 414, where the password can be accepted. If in step 412, the password has not reached an acceptable score, method 400 can continue to step 416, where the password can be rejected. In step 418, the user can be prompted to enter a new password, as the previous one can be too insecure. Method 400 can return to step 402 and repeat, where the user can interact with the application and provide a password for an account.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for computing password strength comprising:
a computing device, which comprises hardware executing software, identifying a password consisting of a sequence of at least two characters;
the computing device determining a position of each of the characters of the sequence relative to a layout of an input device used for password entry, wherein each position corresponds to an input region of the input device;

the computing device applying a proximity algorithm configured to generate a proximity score for the determined positions based upon a pattern produced by the positions given the layout of the input device, wherein the applying step further comprises:

computing a distance between each consecutive pair of positions corresponding to the at least two characters processed in an order of the sequence;

computing an average distance based upon the distances between each consecutive pair;

calculating the proximity score based upon the computed average distance; and the computing device computing a password strength score based at least in part upon the proximity score.

2. The method of claim 1, wherein the input device is a keyboard, wherein each of the input region is a key on the keyboard.

3. The method of claim 1, further comprising:

the computing device taking a programmatic action relating to the password when the password strength exceeds a previously established threshold value; and the computing device taking a different programmatic action relating to the password when the password strength does not exceed the previously established threshold value.

4. The method of claim 3, wherein the programmatic action taken when the password strength exceeds the threshold is accepting the password, and wherein the different programmatic action taken when the password strength does not exceed the threshold is denying the password.

5. The method of claim 1, further comprising:

the computing device prompting a user to enter a new password, wherein the identified password is one received in response to the prompting;

the computing device comparing the password strength score to a previously determined threshold;

the computing device, based upon the comparison, determining that too strong of a pattern exists for the password to be a strong password; and the computing device presenting a notification to the user that the password is weak based upon an existence of the pattern formed by the sequence relative to the layout.

6. The method of claim 1, wherein the proximity algorithm generates a greater proximity score for patterns easily discernable by an observer in viewable range of the input region of the input device due to consecutive characters in the sequence of the password being proximately positioned on the input device than a score generated for patterns less easily discernable by the observers.

7. The method of claim 1, wherein the applying of the proximity algorithm comprises:

the computing device computing a center point of the determined positions for the layout;

the computing device computing a distance of each of the determined positions from this center point; and the computing device calculating the proximity score based upon the distances of each of the determined positions and the center point.

8. The method of claim 1, wherein the applying of the proximity algorithm comprises:

the computing device computing a number of line segments needed to pass through the positions to create the sequence; and the computing device calculating the proximity score based upon the number of computed line segments.

9. The method of claim 1, further comprising:

the computing device biasing the proximity algorithm to disfavor a subset of common positions given the layout relative to other positions, where the disfavoring applies to a position corresponding to at least one of the first character in the sequence and the last character in the sequence, wherein the biasing results in a weaker than baseline proximity score when at least one of a first and a last character in the sequence corresponds to one of the common positions.

10. A storage device comprising:

a non-transitory computer usable storage medium having computer usable program code embodied therewith, said computer usable program code being configured for execution by a processor of a computing device, the computer usable program code comprising:

computer usable program code configured to identify a password consisting of a sequence of at least two characters;

computer usable program code configured to determine a position of each of the characters of the sequence relative to a layout of an input device used for password entry, wherein each position corresponds to an input region of the input device;

computer usable program code configured to apply a proximity algorithm configured to generate a proximity score for the determined positions based upon a pattern produced by the positions given the layout of the input device, wherein the proximity algorithm generates a greater proximity score for patterns easily discernable by an observer in viewable range of the input region of the input device due to consecutive characters in the sequence of the password being proximately positioned on the input device than a score generated for patterns less easily discernable by the observer; and computer usable program code configured to compute a password strength score based at least in part upon the proximity score.

11. The storage device of claim 10, wherein the input device is a keyboard, wherein each of the input region is a key on the keyboard.

12. The storage device of claim 10, further comprising:

computer usable program code configured to take a programmatic action relating to the password when the password strength exceeds a previously established threshold value; and computer usable program code configured to take a different programmatic action relating to the password when the password strength does not exceed the previously established threshold value.

13. The storage device of claim 12, wherein the programmatic action taken when the password strength exceeds the threshold is accepting the password, and wherein the different programmatic action taken when the password strength does not exceed the threshold is denying the password.

14. The storage device of claim 10, further comprising:

computer usable program code configured to prompt a user to enter a new password, wherein the identified password is one received in response to the prompting;

computer usable program code configured to compare the password strength score to a previously determined threshold;

computer usable program code configured to determine that too strong of a pattern exists for the password to be a strong password based upon the comparison; and computer usable program code configured to present a notification to the user that the password is weak based upon an existence of the pattern formed by the sequence relative to the layout.

15. The storage device of claim 10, wherein the applying of the proximity algorithm comprises:
computer usable program code configured to compute a center point of the determined positions for the layout;
computer usable program code configured to compute a distance of each of the determined positions from this center point; and
computer usable program code configured to calculate the proximity score based upon the distances of each of the determined positions and the center point.

16. The storage device of claim 10, wherein the programmatic code configured to apply the proximity algorithm comprises:
computer usable program code configured to compute a number of line segments needed to pass through the positions to create the sequence; and
computer usable program code configured to calculate the proximity score based upon the number of computed line segments.

17. The storage device of claim 10, wherein the applying of the proximity algorithm comprises:
computer usable program code configured to compute an average distance between each consecutive pair of positions corresponding to the characters processed in an order of the sequence;
computer usable program code configured to compute an average distance based upon the distances between each consecutive pair; and
computer usable program code configured to calculate the proximity score based upon the computed average distance.

18. The storage device of claim 10, further comprising:
computer usable program code configured to bias the proximity algorithm to disfavor a subset of common positions given the layout relative to other positions, where the disfavoring applies to a position corresponding to at least one of the first character in the sequence and the last character in the sequence, wherein the biasing results in a weaker than baseline proximity score when at least one of a first and a last character in the sequence corresponds to one of the common positions.

19. A computer system for computing password strength, the computer system comprising:
one or more processors, one or more computer-readable memories, and one or more computer-readable tangible storage devices;
program instructions, stored on at least one of the one or more storage devices for execution by at least one of the one or more processors via at least one of the one or more memories, to
prompt a user to enter a new password;
responsive to the prompting, receive the new password consisting of a sequence of at least two characters;
determine a position of each of the characters of the sequence relative to a layout of an input device used for password entry, wherein each position corresponds to an input region of the input device;
apply a proximity algorithm configured to generate a proximity score for the determined positions based upon a pattern produced by the positions given the layout of the input device;
compute a password strength score based at least in part upon the proximity score;
compare the password strength score to a previously determined threshold;
based upon the comparison, determine that too strong of a pattern exists for the password to be a strong password; and
present a notification to the user that the password is weak based upon an existence of the pattern formed by the sequence relative to the layout.

20. The computer system of claim 19, wherein said program instructions are further to:
bias the proximity algorithm to disfavor a subset of common positions given the layout relative to other positions, where the disfavoring applies to a position corresponding to at least one of the first character in the sequence and the last character in the sequence, wherein the biasing results in a weaker than baseline proximity score when at least one of a first and a last character in the sequence corresponds to one of the common positions.

* * * * *